United States Patent
Jochim et al.

(10) Patent No.: US 11,682,318 B2
(45) Date of Patent: Jun. 20, 2023

(54) METHODS AND SYSTEMS FOR ASSISTING PRONUNCIATION CORRECTION

(71) Applicant: INTERNATIONAL BUSINESS MACHINES CORPORATION, Armonk, NY (US)

(72) Inventors: Charles Arthur Jochim, Dublin (IE); Pierpaolo Tommasi, Dublin (IE); Francesca Bonin, Dublin (IE); Martin Gleize, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 490 days.

(21) Appl. No.: 16/840,811

(22) Filed: Apr. 6, 2020

(65) Prior Publication Data
US 2021/0312831 A1 Oct. 7, 2021

(51) Int. Cl.
*G09B 19/06* (2006.01)
*G10L 15/187* (2013.01)
*G09B 5/04* (2006.01)
*G09B 5/02* (2006.01)

(52) U.S. Cl.
CPC ............ *G09B 19/06* (2013.01); *G10L 15/187* (2013.01); *G09B 5/02* (2013.01); *G09B 5/04* (2013.01)

(58) Field of Classification Search
CPC .............................. G09B 19/06; G10L 15/187
USPC ........................................................ 434/157
See application file for complete search history.

(56) References Cited

U.S. PATENT DOCUMENTS

| 7,890,525 | B2* | 2/2011 | Lu .......................... G06F 40/47 707/763 |
| 8,290,775 | B2 | 10/2012 | Etezadi et al. |
| 9,275,633 | B2 | 3/2016 | Cath et al. |
| 9,472,184 | B2 | 10/2016 | Tjalve et al. |

(Continued)

FOREIGN PATENT DOCUMENTS

CN  1267805 C  8/2006

OTHER PUBLICATIONS

Yow, B. W. et al., "Toward Unsupervised Discovery of Pronunciation Error Patterns Using Universal Phoneme Posteriorgram for Computer-Assisted Language Learning", 2013 IEEE Int. Conf. on Acoustics, Speech and Signal Processing (ICASSP), pp. 8232-8236, (2013), May 26, 2013 to May 31, 2013, Vancouver, BC, Canada, Conf. Paper, IEEE, Piscataway, NJ, USA, first available on Nov. 28, 2013, last updated Nov. 28, 2013.

(Continued)

*Primary Examiner* — Jay Trent Liddle
*Assistant Examiner* — Alyssa N Brandley
(74) *Attorney, Agent, or Firm* — Griffiths & Seaton PLLC

(57) ABSTRACT

Embodiments for assisting pronunciation correction are described. A representation of a user pronunciation of an utterance is received. A representation of a target pronunciation of the utterance is identified. The representation of the user pronunciation of the utterance is compared to the representation of the target pronunciation of the utterance. A recommendation associated with correcting the user pronunciation of the utterance is generated based on the comparing of the representation of the user pronunciation of the utterance to the representation of the target pronunciation of the utterance and information associated with the user.

21 Claims, 6 Drawing Sheets

(56) References Cited

U.S. PATENT DOCUMENTS

| | | | |
|---|---|---|---|
| 2003/0225580 A1 | 12/2003 | Lin | |
| 2007/0067174 A1* | 3/2007 | Verma | G10L 15/26 |
| | | | 704/E15.045 |
| 2019/0189116 A1* | 6/2019 | Li | G10L 15/07 |
| 2019/0303797 A1* | 10/2019 | Javali | G09B 19/06 |
| 2021/0110818 A1* | 4/2021 | Kim | G10L 15/187 |
| 2021/0151036 A1* | 5/2021 | Diment | G10L 15/187 |

OTHER PUBLICATIONS

"Automatic detection of frequent pronunciation errors made by L2-learners" Truong et al. Interspeech Sep. 4-8, 2005 Lisbon, Portugal.

"Speech verification for computer assisted pronunciation training" Ai, Renlong Doctorial Thesis Jun. 26, 2018.

"Automatic Pronunciation Error Detection and Feedback Generation for CALL Applications" Renlong Ai DFKI GmbH, Language Technology Lab Alt-Moabit 91c, 10559, Berlin, Germany.

"Detection of Typical Pronunciation Errors in Non-native English Speech Using Convolutional Recurrent Neural Networks" Aleksandr Diment et al. Tampere University Tampere, Finland.

* cited by examiner

METHODS AND SYSTEMS FOR ASSISTING PRONUNCIATION CORRECTION

BACKGROUND OF THE INVENTION

Field of the Invention

The present invention relates in general to computing systems, and more particularly, to various embodiments for assisting in the correction of the pronunciation of natural language.

Description of the Related Art

In recent years, the use of various computing systems and applications for self-driven (or self-directed) education and learning has become increasingly common. As one example, many people now use such systems to learn a new language (i.e., natural or spoken language, such as English, Italian, etc.), as opposed to utilizing more traditional means, such as taking classes (e.g., from an education institution) or hiring an instructor (e.g., a human teacher or other professional).

Arguably one of the most important aspects of learning a language (or becoming more proficient at speaking and/or understanding a language) is correct pronunciation. Learning correct pronunciation often requires continuous and/or regular feedback and/or instruction, which is typically readily available when using traditional learning methods. However, current self-driven systems for learning a language generally have limited capabilities with respect to automatically detecting pronunciation errors and/or providing useful feedback for correcting or improving pronunciation.

SUMMARY OF THE INVENTION

Various embodiments for assisting pronunciation correction, by a processor, are provided. A representation of a user pronunciation of an utterance is received. A representation of a target pronunciation of the utterance is identified. The representation of the user pronunciation of the utterance is compared to the representation of the target pronunciation of the utterance. A recommendation associated with correcting the user pronunciation of the utterance is generated based on the comparing of the representation of the user pronunciation of the utterance to the representation of the target pronunciation of the utterance and information associated with the user.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
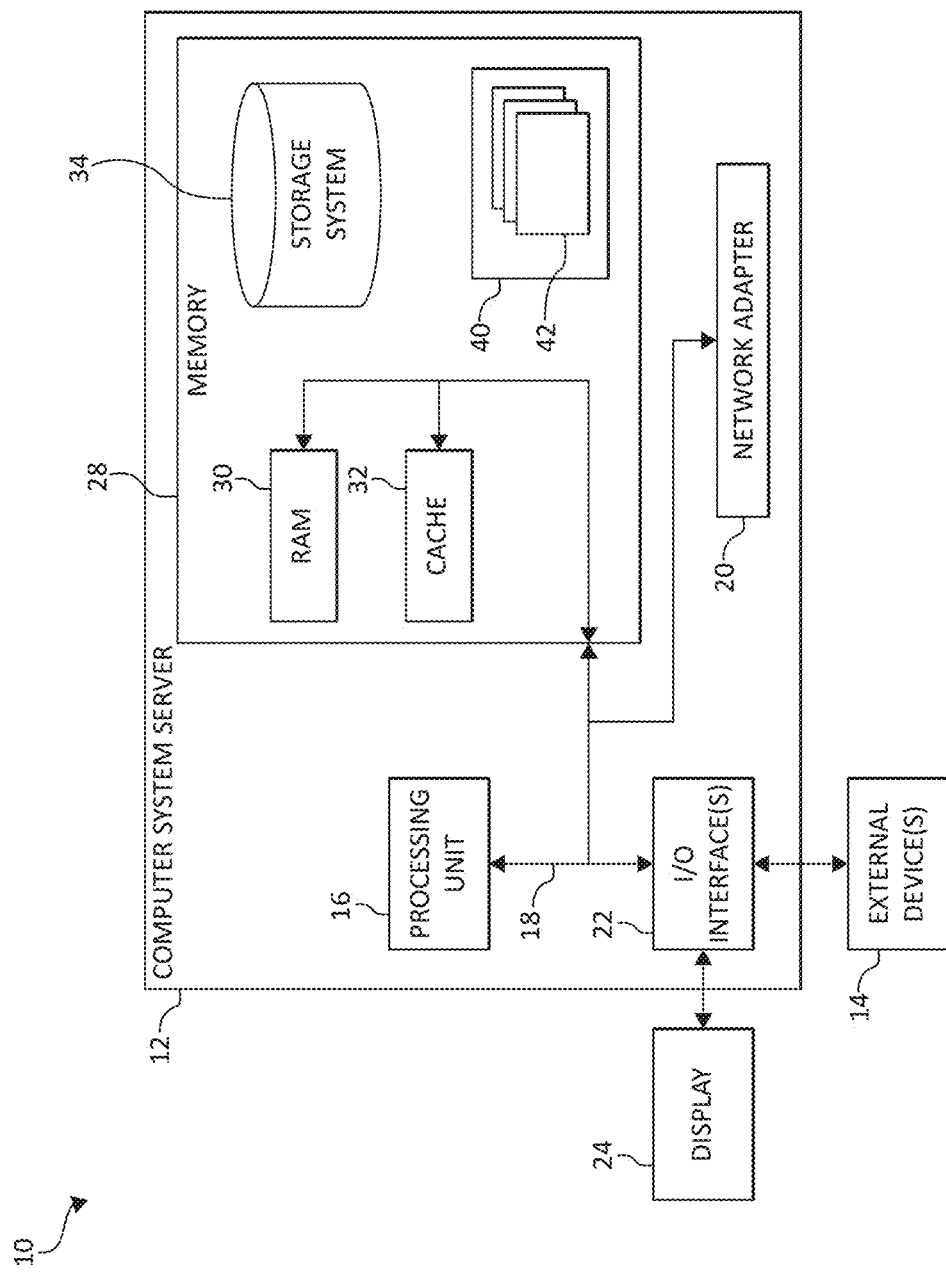
FIG. 1 is a block diagram depicting an exemplary computing node according to an embodiment of the present invention.

As discussed above, in recent years, the use of various computing systems and applications for self-driven (or self-directed) education and learning has become increasingly common. As one example, many people now use such systems to learn a new language (i.e., natural or spoken language, such as English, Italian, etc.), as opposed to utilizing more traditional means, such as taking classes (e.g., from an education institution) or hiring an instructor (e.g., a human teacher or other professional).

Arguably one of the most important aspects of learning a language (or becoming more proficient at speaking and/or understanding a language) is correct pronunciation. Learning correct pronunciation often requires continuous and/or regular feedback and/or instruction, which is typically readily available when using traditional learning methods. However, current self-driven systems for learning a language generally have limited capabilities with respect to automatically detecting pronunciation errors and/or providing useful feedback for correcting or improving pronunciation.

For example, some current systems provide a warning to users when a word in a non-target language is spoken, while others indicate pronunciation errors but require a reference text of the utterance(s), do not take into account the target language, the user's native language or any other information about the user, and do have offer any sort of adaptation or learning functionality.

To address these needs and/or the shortcomings in the prior art, embodiments described herein provide methods and systems that, for example, detect pronunciation errors in spoken utterances (e.g., in natural languages, such as Italian, English, etc.). More particularly, in some embodiments, deviations between a user's pronunciation and a target (e.g., "correct," "ideal," etc.) pronunciation are detected, and feedback (e.g., recommendations/suggestions for making corrections) is generated and provided to the user.

In some embodiments, the methods and/or systems utilize information associated with the user(s) and/or the language(s) associated with the use of the system. For example, the user's native language (or a first or primary language), along with information associated with the user's native language, may be taken into account. Other information associated with the user may (also) be utilized, such as information related to the user's previous interaction(s) with the system (e.g., previous feedback provided and/or the effectiveness of such feedback) and any other information associated with the user described herein (e.g., the user's age, medical history, etc.). Additionally, the target language (or second/secondary or new language being learned) and/or information associated with the target language may be taken into account or utilized (e.g., common/previous pronunciation errors and/or feedback provided for the target language when the system was previous utilized by the user and/or other users). Further, the system may utilize combinations of the available information (e.g., the user's native language is English, and they are learning Italian).

In some embodiments, if the user's pronunciation of the utterance deviates from the target pronunciation by an amount that exceeds a predetermined threshold, the system generates a recommendation for correcting the pronunciations and provides an indication of such to the user. For example, the system may render an aural indication, such as a rendering of the target pronunciation utilizing one or more speakers (e.g., associated with and/or integrated into a computing device) and/or rendering text-based feedback and/or recommendations (e.g., utilizing a display screen of a computing device, such as via a pop-up window, text message, email, etc.). In some embodiments, if the deviation from the target pronunciation below the threshold, the system may generate positive feedback (e.g., "good job") utilizing aural and/or visual methods (e.g., a speaker and/or a display screen).

This process may be repeated such that the system may continuously learn how the generated recommendations affect the user's (or users') pronunciation, which may be utilized, perhaps along with explicit feedback provided by the user(s), to improve the performance of the system over time. As such, in some embodiments, the methods and systems described herein utilize a cognitive analysis (or machine learning, etc.), as is commonly understood.

As one example, consider a user, whose native language is English, attempting to say "I ran two miles" in Italian. The user's utterance is /i.o ko.ro du.e mi.la/ (as expressed utilizing the International Phonetic Alphabet (IPA)). It should be noted that the correct Italian translation is "Io corro due miglia." It should also be noted that the user's pronunciation of the sentence (or utterance) in Italian is not correct (or at least not ideal), as will be discussed further below.

Current systems (e.g., speech-to-text systems) may ("correctly") generate the appropriate Italian sentence of "Io corro due miglia." In other words, current systems may combine appropriate acoustic and translation models to generate the sentence. However, in order to do so, such systems (i.e., the translation model(s)) essentially correct and/or overlook the mispronunciation(s).

In contrast, the methods and systems described herein may detect and utilize the mispronunciation. For example, the system may generate a notification (e.g., via aural and/or text-based/visual methods) suggesting that the utterance be pronounced as /i.o kor.ro du.e mi.λ:a/ (again, as expressed utilizing the IPA, with emphasis added for purposes of clarity). In particular, the system may note that the user did not correctly pronounce both "Rs" in "corro" and the "L" sound in "miglia." In such an example, the system may cause an aural indication of the target pronunciation (of at least the portion(s) of the utterance that were not pronounced correctly if not the entire utterance) to be rendered and/or provide recommendations (e.g., via aurally and/or visually), such as "Be sure to pronounce both Rs in 'corro'" or "Elongate the R sound in 'corro'" and "'Miglia' should have a "double L" sound such as in the English word 'million.'"

As another example, consider a user who wants to pronounce "slip" correctly in English, regardless of what their native language is. The user's utterance is /slIp/ (in IPA) (which sounds like "sleep"), as opposed to /slip/.

In some embodiments, the system may determine the possibility that the user is attempting to say "slip," but there is some uncertainty. The system may generate an indication of a query, asking for clarification (e.g., "Were you trying to say 'slip' or 'sleep?'"). After the user confirms that they were trying to say "slip," the system may render the correct pronunciation and/or generate an appropriate recommendation/correction (e.g., "Try elongating the vowel sound or slightly moving your tongue back.").

As another possibility (or embodiment), the system may (incorrectly) initial determine that the user is attempting to say "sleep," but ask for confirmation as described above. After the user clarifies that the desired word is "slip," the system may then generate a response, such as described above.

As described above, in some embodiments, the system is capable of learning the phonetic habits of users and/or customizing recommendations for users. For example, if the system has learned (e.g., over time) that a particular user has difficulty in correctly pronouncing vowels in English, the system may appropriately customize the feedback to account for this (e.g., based on previous interactions with the same user and/or other users).

At least some of the aspects of functionality described herein may be performed utilizing a cognitive analysis (or machine learning technique). The cognitive analysis may include natural language processing (NLP) and/or natural language understanding (NLU), or NLP and/or NLU processes, such classifying natural language, analyzing tone, and analyzing sentiment (e.g., scanning for keywords, key phrases, etc.) with respect to, for example, the content of detected utterances, communications sent to and/or received by users, and/or other available data sources. In some embodiments, Mel-frequency cepstral coefficients (MFCCs) (e.g., for audio content detected by a microphone) and/or region-based convolutional neural network (R-CNN) pixel mapping (e.g., for object detection/classification in images/videos), as are commonly understood, may (also) be used.

In some embodiments, a cognitive analysis may be used to generate profiles for users, determine the utterance(s) they are attempting to speak, and/or generate recommendations for (or assist in) pronunciation correction. Such may be performed utilizing various data (or information) sources associated with, for example, users and/or language (e.g., spoken/natural languages). The data sources may include any appropriate data sources associated with the user(s) that are accessible by the system (perhaps with the permission or authorization of the user). Examples of such data sources include, but are not limited to, a profile of (or basic information about) the user (e.g., job title, place of work, length of time at current position, family role, etc.), a schedule or calendar (i.e., the items listed thereon, time frames, etc.), projects (e.g., past, current, or future work-related projects), electronic communications (e.g., email, text messages, etc.), social media activity (e.g., posts, reactions, comments, groups, etc.), browsing history (e.g., web pages visited), and online purchases. Additionally, data may be collected from various types of sensors, such as cameras, microphones, and biometric sensors.

As such, in some embodiments, the methods and/or systems described herein may utilize a "cognitive analysis,"

"cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, assisting pronunciation correction. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device and/or an application. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for assisting (or assisting in/with) pronunciation correction, by a processor, is provided. A representation of a user pronunciation of an utterance is received. A representation of a target pronunciation of the utterance is identified. The representation of the user pronunciation of the utterance is compared to the representation of the target pronunciation of the utterance. A recommendation associated with correcting the user pronunciation of the utterance is generated based on the comparing of the representation of the user pronunciation of the utterance to the representation of the target pronunciation of the utterance and information associated with the user.

The information associated with the user may include at least one of a native natural language of the user and previous pronunciation recommendations associated with the user. The generating of the recommendation associated with correcting the user pronunciation of the utterance may be further based on information associated with a natural language associated with the utterance. The information associated with the natural language associated with the utterance may include at least one of pronunciation mistakes associated with the natural language and previous pronunciation recommendations associated with the natural language.

The generating of the recommendation associated with correcting the user pronunciation of the utterance may be performed utilizing a cognitive analysis. The identifying of the representation of the target pronunciation of the utterance may include generating the representation of the target pronunciation based on the representation of the user pronunciation of the utterance.

A vocalization generated by the user may be detected. The representation of the user pronunciation of the utterance may be generated based on the detected vocalization. An indication of the generated recommendation may be caused to be provided to the user.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of implementing and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
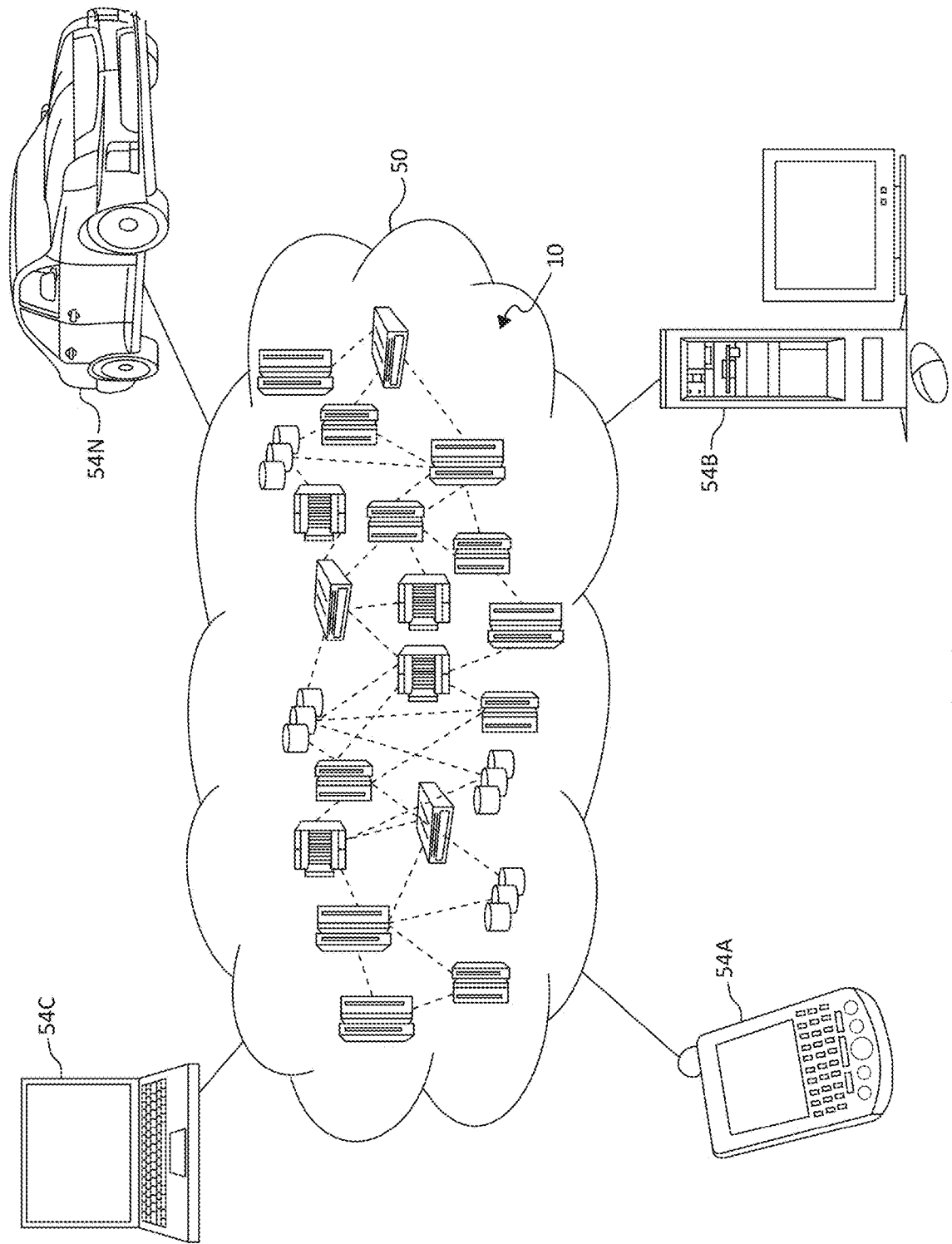
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, PDA or cellular telephone 54A, desktop computer 54B, laptop computer 54C, and/or automobile computer system 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
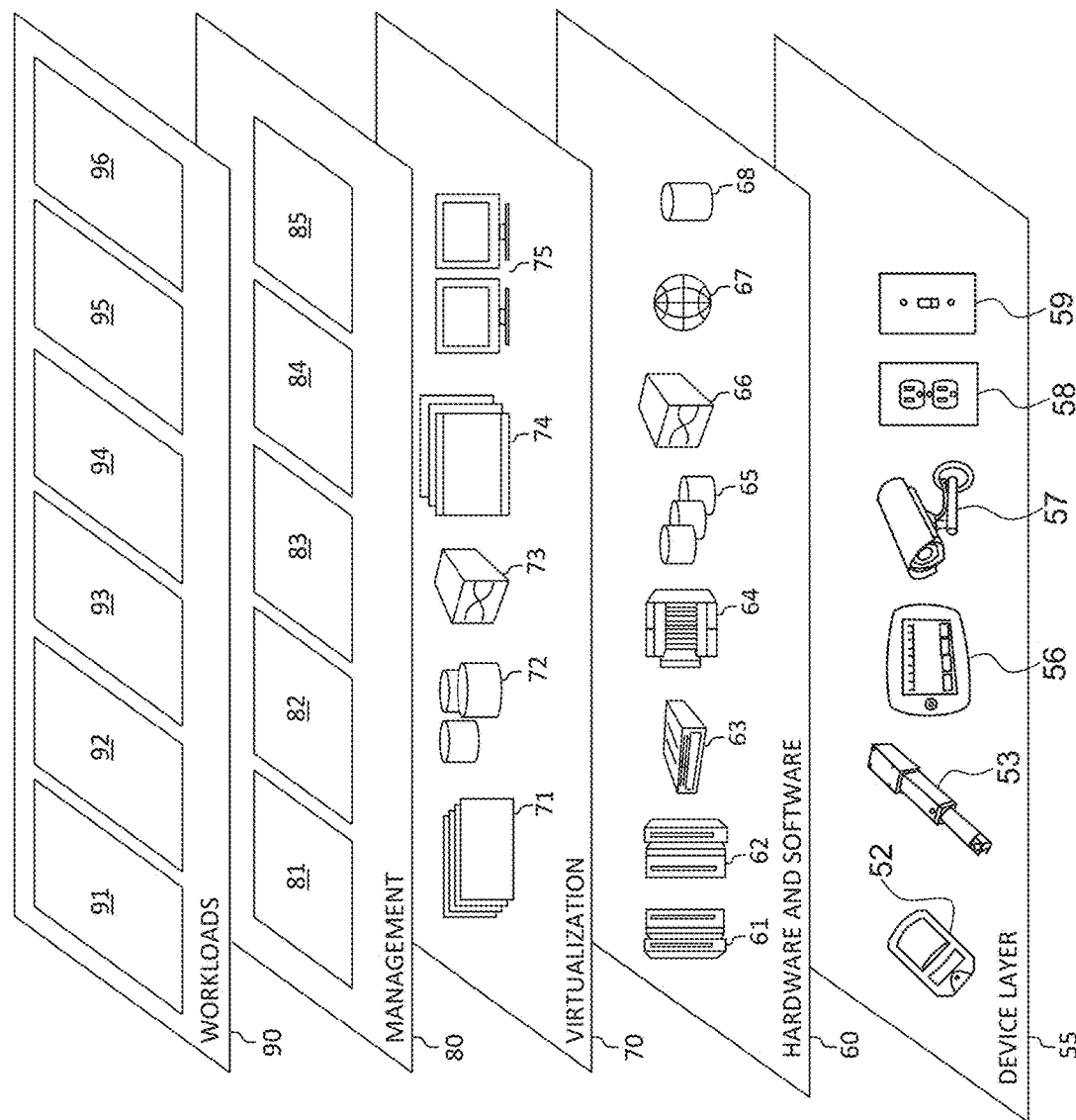
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for assisting pronunciation correction as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for assisting pronunciation correction. The system may detect pronunciation errors in spoken utterances (e.g., in natural languages, such as Italian, English, etc.). More particularly, in some embodiments, deviations between a user's pronunciation and a target (e.g., "correct," "ideal," etc.) pronunciation are detected, and feedback (e.g., recommendations/suggestions for making corrections) is generated and provided.

In some embodiments, the methods and/or systems utilize information associated with the user and/or the language(s) associated with the use of the system. For example, the user's native language (or a first or primary language), along with information associated with the user's native language, may be taken into account. Other information associated with the user may (also) be utilized, such as information related to the user's previous interaction(s) with the system (e.g., previous feedback provided and/or the effectiveness of such feedback) and any other information associated with the user described herein (e.g., the user's age, medical history, etc.). Additionally, the target language (or a second/secondary or new language being learned) and/or information associated with the target language may be taken into account or utilized (e.g., common/previous pronunciation errors and/or feedback provided for the target language when the system was previous utilized by the user and/or other users). Further, the system may utilize combinations of the available information (e.g., the user's native language is English, and they are learning Italian).

Figure 4:
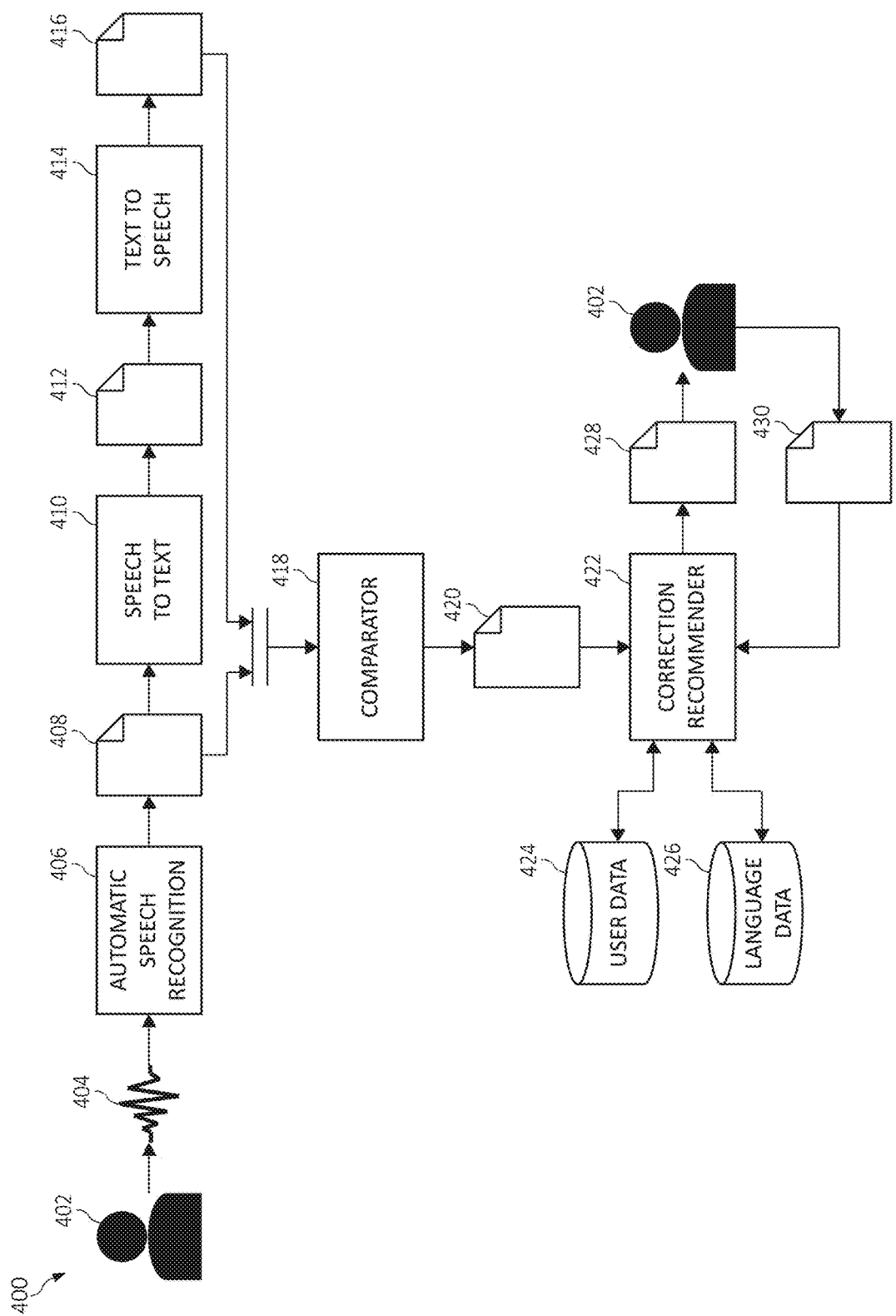
FIG. 4 is a block diagram of a system for assisting pronunciation correction according to an embodiment of the present invention.

FIG. 4 illustrates a system (and/or method) 400 for assisting pronunciation correction according to an embodiment of the present invention. The system 400 may be implemented utilizes one or more computing devices, such as those described above, which may be located locally or remotely (and be in operable communication via any suitable communications network). Although not explicitly shown, the system 400 may utilize (and/or include) a microphone and/or speaker(s) perhaps along with a display screen (e.g., such as those associated with any suitable computing devices, such as a mobile device, desktop PC, etc.). It should be understood that in some embodiments, the user 402 may provide the system 400 with some initial information (e.g., via a settings functionality or user profile), such as their native language, the target language, the particular utterances they will be saying, etc., which may be included in the "user data" and/or "language data" described below.

Still referring to FIG. 4, the user 402 may provide (or generate, speak, etc.) an utterance (or voice-generated sound) 404, which may be detected by the microphone. In the depicted embodiment, the utterance 404 (and/or a signal representative thereof) is provided to an automatic speech recognition (ASR) module 406. The ASR module 406 generates sound wave(s) and/or phonetic data (and/or a representation or file thereof) 408, which is provided to a speech-to-text (STT) module 410. In the depicted embodiment, the STT module 410 then generates "correct" or target text (and/or a representation or file thereof) 412. In other words, the STT module 410 may generate a text-based version of the word(s)/utterance(s) the system determines that the user is saying or attempting to say. The correct text 412 is provided to a text-to-speech (TTS) module 414. The TTS module 414 generates (or identifies) a reference (or target, correct, ideal, etc.) pronunciation sound wave(s) and/or correct phonetic data (and/or a representation or file thereof) 416. In other words, the ASR module 406, the STT module 410, and the TTS module 414, as a whole, receive the input sound (or utterance) 404 from the user 402, transform the sound wave(s) into computer-readable data (or a representation of the user's pronunciation 408), convert the data into transcribed text, and convert the text into a reference/target sound wave (or a representation of the target/correct pronunciation 416).

The representation of the user's pronunciation 408 and the representation of the target pronunciation 416 are provided to a comparator 418. The comparator 418 may compare the representations 408 and 416 to determine "where" the mispronunciation (if any) occurred. In other words, the comparator 418 may compare the representation of the user's pronunciation 408 to the representation of the target pronunciation 416. Exemplary details of this process are provided below. The comparator 418 may generate an output 420 that includes the input data (e.g., the representation of the user's pronunciation 408) combined with information associated with any mispronunciation (e.g., a measure of the mispronunciation, if any).

The output 420 of the comparator 418 is provided to a correction recommender (or correction generator or cognitive module) 422. The correction recommender 422 may include (and/or be implemented with) any suitable computing device or system, such as those described above, and may be configured to perform the generation of recommendations for assisting in pronunciation and/or any associated cognitive analysis, as described herein. The correction recommender 422 may analyze the output 420 to determine if the mispronunciation (if any) exceeds a threshold. The threshold may be predetermined and/or set at a particular value (e.g., percentage) for particular users. If the mispronunciation exceeds the appropriate threshold, the correction recommender 422 generates a recommendation (or feedback) 428 for correcting the user's 402 pronunciation as described above.

In the embodiment shown in FIG. 4, this process may be performed utilizing information associated with the user (or user data) 424 and/or information associated with the language(s) (or language data) 426, which are accessible by the correction recommender 422. The user data 424 may include any appropriate data concerning the user 402 that is stored on a database (or memory), such as their native language, the language(s) they are learning, previous interactions with the system 400, and/or any other information described above (including "language pairs," such as "native Italian speaker learning English"). The language data 426 may include any appropriate data concerning the relevant language(s) (e.g., the user's native language and/or the target language), such as common pronunciation mistakes (e.g., particularly for native speakers of particular languages), feedback/recommendations provided to other users associated with the languages, etc. Based on such data, the correction recommender 422 may generate feedback and/or recommendations that are customized to the particular user 402, the target language, their native language, etc., which may be generated utilizing a cognitive analysis.

Still referring to FIG. 4, the recommendation 428 is provided to the user 402. As described above, the recommendation 428 may include suggestions for correcting the pronunciation of the utterance and/or the correct (or target) pronunciation. For example, the system 400 may generate an aural indication of the target pronunciation (e.g., via a speaker) and also provide suggestions for correcting the pronunciation via text-based methods (e.g., displaying on a display screen). If the deviation between the user's pronunciation and the target pronunciation is below the appropriate threshold, the recommendation 428 may simply include positive feedback (e.g., "Keep up the good work!").

The user 402 may then provide feedback 430 to the system 400 (e.g., via spoken commands/utterances or via text-based methods). For example, the user feedback 430 may include a subsequent attempt at the pronunciation, at which point the process may be reinitiated and/or the system may be able to utilize such to determine the effectiveness of the recommendation 428. Also, the user feedback 430 may include the user indicating that a particular recommendation was useful or some other type of explicit feedback.

Figure 5:
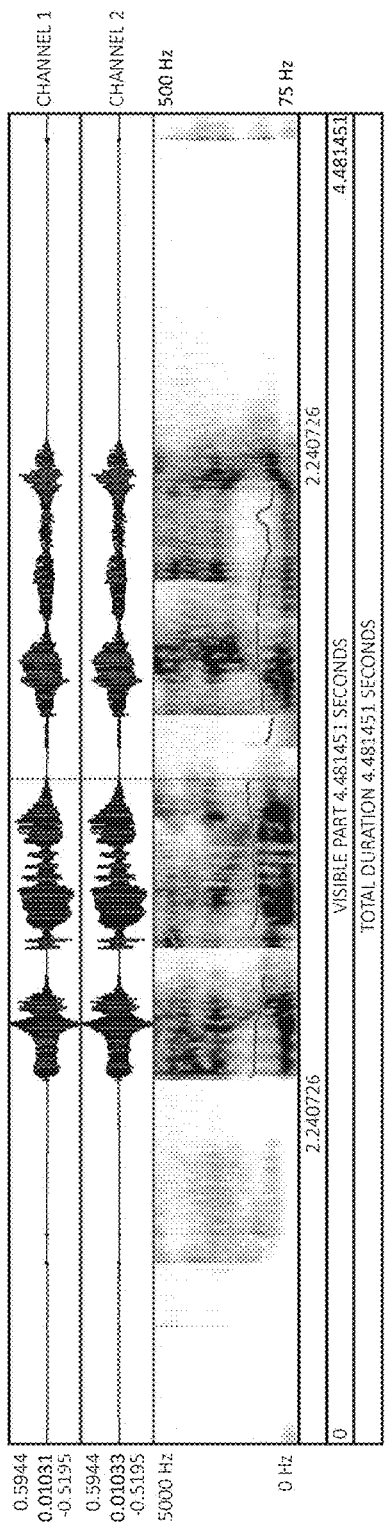
FIGS. 5 and 6 are visualizations of sound waves according to an embodiment of the present invention.
Figure 6:
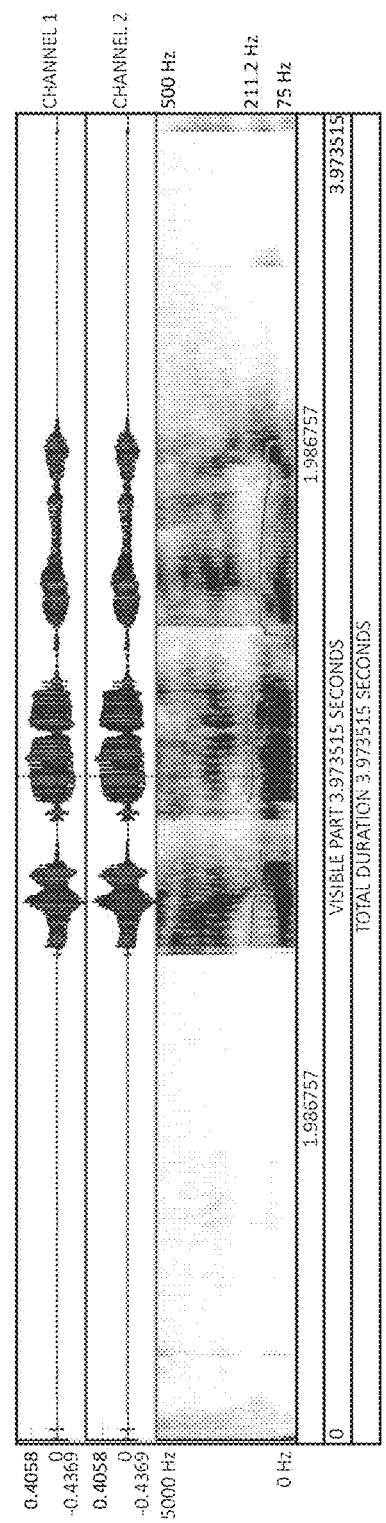

Referring now to FIGS. 5 and 6, visualizations (e.g., spectrograms) 500 and 600 of formant values (and/or utterance sound waves) are respectively shown. Such may be considered to be the representations of pronunciations that are received by the comparator in FIG. 4. In particular, visualization 500 of FIG. 5 may be considered to represent a target pronunciation, while visualization 600 of FIG. 6 may be considered to represent a user pronunciation. The comparator may measure the differences (if any) in the acoustic waves of the visualizations 500 and 600. Such may be performed by aligning the two waves (or representations) and measuring the differences in the formant values (e.g., F1, F2, F3, etc.), as will be appreciated by ones skilled in the art. The comparator may also determine the differences between the phonetic transcriptions of the acoustic signal. For example, in the example described above with respect to the Italian utterance "To corro due miglia," the comparator (and/or system as a whole) may indicate that the pronunciations of /i.o/ and /du.e/ are acceptable, but that is not the case with /ko.ro/ vs. /kor.ro/ and /mi.la/ vs /mi.λ:a/.

Referring again to FIG. 4, it should be understood that the correction recommender 422 may be a learning module (and/or be configured to perform a cognitive analysis) that can take the output from the comparator, available user data (e.g., native language, learning history, known languages, etc.), and available language data (e.g., common pronunciation mistakes, successful corrections, etc.) to predict or generate meaningful suggestions to correct pronunciation. For example, again referring the Italian utterance "To corro due miglia," the correction recommender 422 may receive the following as input: from the comparator, an identification of the differences between the acoustic signal (or user's pronunciation) and the phonetic transcription of "corro" and missing fricative sounds (or the target pronunciation); from the user data, the user is an American English speaker who is learning Italian; and from the language data, the "R" sound is a commonly mispronounced by Italian learners from many different native languages. Also, as alluded to above, the system may recommend a good correction based on a user's explicit feedback (e.g., "+1," "thumbs-up," "thanks!," etc.) or implicit feedback (e.g., the system compares a corrected pronunciation to a previous pronunciation).

As such, in some embodiments, systems (and/or methods) are provided that receive (or detect) user generated speech (or utterance) and provides feedback concerning pronunciation (or mispronunciation) and suggests corrections. The system may base the suggestion(s) on information related to the user's native language (or a first language) and/or the target language (or a second language, the language the user is trying to learn, etc.).

For example, the system may include (and/or utilize) one or more components that detects the utterance (or input sound wave associated with the utterance) and generates (or identifies) a reference (or target, correct, ideal, etc.) pronunciation. The system may (also) include a component that compares sound waves and/or representations thereof. For example, the system may receive the user's pronunciation (or sound wave thereof) and a phonetic transcription thereof as input, along with a reference pronunciation (or sound wave thereof) and a reference phonetic transcription. The output of the component may include an indication of the differences between the sound waves and transcriptions.

The system may also include a component that provides pronunciation recommendations (or suggestions, corrections, etc.) (i.e., a correction recommender or cognitive module). For example, the difference(s) (if any) between the sound waves and transcriptions may be received as input by the correction recommender. The correction recommender may have access to information associated with the user (e.g., previous interactions with the system, previous recommendations, the user's languages, etc.) and/or information associated with at least one of the user' native language, the languages the user can speak, the target language, etc. (e.g., common mistakes, learnt patterns, successful corrections, correlations in language pairs, etc.).

The correction recommender may generate insights, correlations, etc. based on the input, generated recommendations, and/or feedback (or utilizing machine learning, cognitive analysis, etc.). The learned results may be stored in or with, for example, the information associated with the user and/or the language(s). The output may include the generated recommendation(s) that may include mispronunciation details, suggested corrections/tips, which may be contextualized to a pertinent language pair (e.g., the user's native language and the target language), perhaps along with an indication (e.g., aural) of the target pronunciation. As suggested above, user feedback and/or performance may be received and stored for further learning such that the performance of the system is improved over time.

As such, the methods and systems described herein are able to provide meaningful suggestions to correct pronunciation beyond simply identifying pronunciation errors. Additionally, the methods and systems may learn which suggestions have a greater impact on correcting pronunciation by collecting user feedback and/or observing changes in pronunciation.

Figure 7:
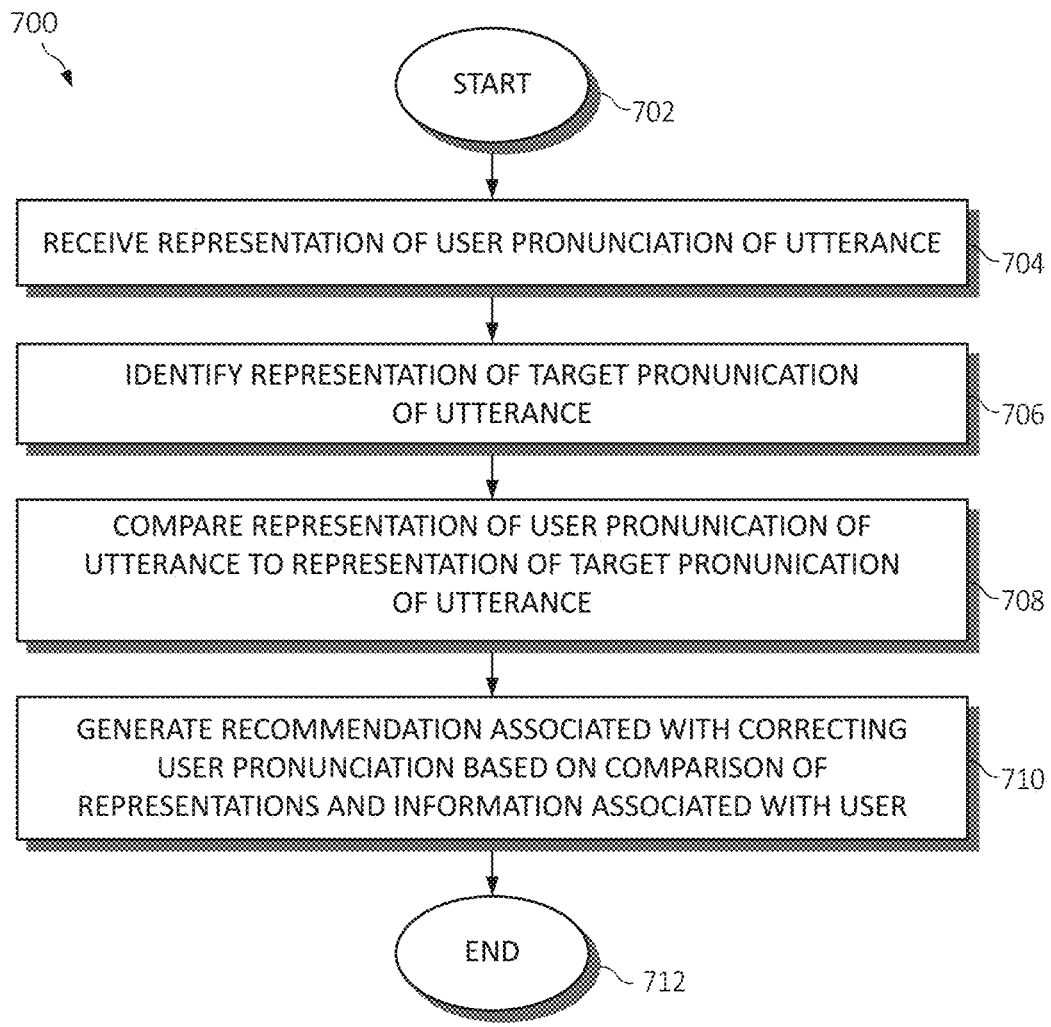
FIG. 7 is a flowchart diagram of an exemplary method for assisting pronunciation correction according to an embodiment of the present invention.

Turning to FIG. 7, a flowchart diagram of an exemplary method 700 for assisting (or facilitating) pronunciation correction is illustrated. Method 700 begins (step 702) with, for example, a system such as described above being implemented on any suitable computing device(s) and a user selecting a target language to learn and/or selecting a particular utterance in a target language to pronounce. In some embodiments, the user may provide various types of initial information to the system, such as native language, selection of target language, selection of utterances, etc.

A representation of a user pronunciation of an utterance is received (step 704). A vocalization generated by the user may be detected. The representation of the user pronunciation of the utterance may be generated based on the detected vocalization.

A representation of a target pronunciation of the utterance is identified (step 706). The identifying of the representation of the target pronunciation of the utterance may include generating the representation of the target pronunciation based on the representation of the user pronunciation of the utterance.

The representation of the user pronunciation of the utterance is compared to the representation of the target pronunciation of the utterance (step 708).

A recommendation associated with correcting the user pronunciation of the utterance is generated based on the comparing of the representation of the user pronunciation of the utterance to the representation of the target pronunciation of the utterance and information associated with the user (step 710). The information associated with the user may include at least one of a native natural language of the user and previous pronunciation recommendations associated with the user. The generating of the recommendation associated with correcting the user pronunciation of the utterance may be further based on information associated with a natural language associated with the utterance. The information associated with the natural language associated with the utterance may include at least one of pronunciation mistakes associated with the natural language and previous pronunciation recommendations associated with the natural language.

The generating of the recommendation associated with correcting the user pronunciation of the utterance may be performed utilizing a cognitive analysis. An indication of the generated recommendation may be caused to be provided to the user.

Methods 700 ends (step 712) with, for example, the user implementing the generated recommendation, such as by again pronouncing (or attempting to pronounce) the utterance. The user's performance (e.g., improvement and/or lack thereof) may be utilized as feedback, perhaps along with explicit feedback provided by the user, to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instruction.

The invention claimed is:

1. A method for assisting pronunciation correction, by a processor, comprising: receiving a representation of a user pronunciation of an utterance by receiving an acoustic signal of sound wave data of the utterance and transforming the sound wave data of the utterance into a phonetic transcription of the utterance; identifying a representation of a target pronunciation of the utterance by: receiving the phonetic transcription of the utterance, identifying, based on the phonetic transcription, target words in the utterance the user is attempting to pronounce, wherein the identifying of the target words is performed only after receiving the phonetic transcription of the utterance, generating a phonetic transcription of the target pronunciation based on the identification of the target words, and transforming the phonetic transcription of the target pronunciation into sound wave data of the target pronunciation; executing machine learning logic to compare the representation of the user pronunciation of the utterance to the representation of the target pronunciation of the utterance, wherein the comparison identifies differences between the sound wave data of the utterance and the sound wave data of the target pronunciation inclusive of fricative sounds missing from the user pronunciation; generating, by the machine learning logic, a recommendation associated with correcting the user pronunciation of the utterance based on the comparing of the representation of the user pronunciation of the utterance to the representation of the target pronunciation of the utterance and information associated with the user; and executing the machine learning logic to receive feedback from the user with respect to the recommendation, wherein the feedback is utilized by the machine learning logic to iteratively update and enhance the identification of the representation of the target pronunciation of the utterance and subsequent recommendations.

2. The method of claim 1, wherein the information associated with the user includes at least one of a native natural language of the user and previous pronunciation recommendations associated with the user.

3. The method of claim 1, wherein the generating of the recommendation associated with correcting the user pronunciation of the utterance is further based on information associated with a natural language associated with the utterance.

4. The method of claim 3, wherein the information associated with the natural language associated with the utterance includes at least one of pronunciation mistakes associated with the natural language and previous pronunciation recommendations associated with the natural language.

5. The method of claim 1, wherein the generating of the recommendation associated with correcting the user pronunciation of the utterance is performed utilizing a cognitive analysis.

6. The method of claim 1, wherein the identifying of the representation of the target pronunciation of the utterance includes generating the representation of the target pronunciation based on the representation of the user pronunciation of the utterance.

7. The method of claim 1, further comprising:
detecting a vocalization generated by the user;
generating the representation of the user pronunciation of the utterance based on said detected vocalization; and
causing an indication of said generated recommendation to be provided to the user.

8. A system for assisting pronunciation correction comprising:
a processor executing instructions stored in a memory device, wherein the processor:
receives a representation of a user pronunciation of an utterance by receiving an acoustic signal of sound wave data of the utterance and transforming the sound wave data of the utterance into a phonetic transcription of the utterance;
generates a representation of a target pronunciation of the utterance by:
receiving the phonetic transcription of the utterance,
identifying, based on the phonetic transcription, target words in the utterance the user is attempting to pronounce, wherein the identifying of the target words is performed only after receiving the phonetic transcription of the utterance,
generating a phonetic transcription of the target pronunciation based on the identification of the target words, and
transforming the phonetic transcription of the target pronunciation into sound wave data of the target pronunciation;
executes machine learning logic to compare the representation of the user pronunciation of the utterance to the representation of the target pronunciation of the utterance, wherein the comparison identifies differences between the sound wave data of the utterance and the sound wave data of the target pronunciation inclusive of fricative sounds missing from the user pronunciation;
generates, by the machine learning logic, a recommendation associated with correcting the user pronunciation of the utterance based on the comparing of the representation of the user pronunciation of the utterance to the representation of the target pronunciation of the utterance and information associated with the user; and
executes the machine learning logic to receive feedback from the user with respect to the recommendation, wherein the feedback is utilized by the machine learning logic to iteratively update and enhance the generation of the representation of the target pronunciation of the utterance and subsequent recommendations.

9. The system of claim 8, wherein the information associated with the user includes at least one of a native natural language of the user and previous pronunciation recommendations associated with the user.

10. The system of claim 8, wherein the generating of the recommendation associated with correcting the user pronunciation of the utterance is further based on information associated with a natural language associated with the utterance.

11. The system of claim 10, wherein the information associated with the natural language associated with the utterance includes at least one of pronunciation mistakes associated with the natural language and previous pronunciation recommendations associated with the natural language.

12. The system of claim 8, wherein the generating of the recommendation associated with correcting the user pronunciation of the utterance is performed utilizing a cognitive analysis.

13. The system of claim 8, wherein the generating of the representation of the target pronunciation of the utterance includes generating the representation of the target pronunciation based on the representation of the user pronunciation of the utterance.

14. The system of claim 8, wherein the processor further:
detects a vocalization generated by the user;
generates the representation of the user pronunciation of the utterance based on said detected vocalization; and
causes an indication of said generated recommendation to be provided to the user.

15. A computer program product for assisting pronunciation correction, by a processor, the computer program product comprising a non-transitory computer-readable storage medium having computer-readable program code portions stored therein, the computer-readable program code portions comprising: an executable portion that receives a representation of a user pronunciation of an utterance by receiving an acoustic signal of sound wave data of the utterance and transforming the sound wave data of the utterance into a phonetic transcription of the utterance; an executable portion that identifies a representation of a target pronunciation of the utterance by: receiving the phonetic transcription of the utterance, identifying, based on the phonetic transcription, target words in the utterance the user is attempting to pronounce, wherein the identifying of the target words is performed only after receiving the phonetic transcription of the utterance, generating a phonetic transcription of the target pronunciation based on the identification of the target words,
and transforming the phonetic transcription of the target pronunciation into sound wave data of the target pronunciation; an executable portion that executes machine learning logic to compare the representation of the user pronunciation of the utterance to the representation of the target pronunciation of the utterance, wherein the comparison identifies differences between the sound wave data of the utterance and the sound wave data of the target pronunciation inclusive of fricative sounds missing from the user pronunciation; an executable portion that generates, by the machine learning logic, a recommendation associated with correcting the user pronunciation of the utterance based on the comparing of the representation of the user pronunciation of the utterance to the representation of the target pronunciation of the utterance and information associated with the user; and an executable portion that executes the machine learning logic to receive feedback from the user with respect to the recommendation, wherein the feedback is utilized by the machine learning logic to iteratively update and enhance the identification of the representation of the target pronunciation of the utterance and subsequent recommendations.

16. The computer program product of claim 15, wherein the information associated with the user includes at least one of a native natural language of the user and previous pronunciation recommendations associated with the user.

17. The computer program product of claim 15, wherein the generating of the recommendation associated with correcting the user pronunciation of the utterance is further based on information associated with a natural language associated with the utterance.

18. The computer program product of claim 17, wherein the information associated with the natural language associated with the utterance includes at least one of pronunciation mistakes associated with the natural language and previous pronunciation recommendations associated with the natural language.

19. The computer program product of claim 15, wherein the generating of the recommendation associated with correcting the user pronunciation of the utterance is performed utilizing a cognitive analysis.

20. The computer program product of claim 15, wherein the identifying of the representation of the target pronunciation of the utterance includes generating the representation of the target pronunciation based on the representation of the user pronunciation of the utterance.

21. The computer program product of claim 15, wherein the computer-readable program code portions further include:
an executable portion that detects a vocalization generated by the user;
an executable portion that generates the representation of the user pronunciation of the utterance based on said detected vocalization; and
an executable portion that causes an indication of said generated recommendation to be provided to the user.

* * * * *